United States Patent
Lee et al.

(10) Patent No.: US 8,442,016 B1
(45) Date of Patent: May 14, 2013

(54) CO-EXISTANCE OF BLUETOOTH AND WIRELESS LOCAL AREA NETWORK

(75) Inventors: George Lee, San Jose, CA (US); Zhenyu Zhang, San Jose, CA (US); Gladys Yuen Yan Wong, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 764 days.

(21) Appl. No.: 12/435,707

(22) Filed: May 5, 2009

(51) Int. Cl.
*H04W 4/00* (2009.01)
*G06F 15/16* (2006.01)
*H04B 7/00* (2006.01)

(52) U.S. Cl.
USPC .......................... 370/338; 709/232; 455/41.2

(58) Field of Classification Search ............. 370/338
See application file for complete search history.

(56) References Cited

U.S. PATENT DOCUMENTS

| | | | |
|---|---|---|---|
| 7,697,897 B2 * | 4/2010 | Duerdodt et al. | 455/63.1 |
| 7,844,222 B2 * | 11/2010 | Grushkevich | 455/41.2 |
| 7,856,000 B2 * | 12/2010 | Ross | 370/338 |
| 7,933,561 B2 * | 4/2011 | Sanguinetti | 455/78 |
| 2004/0192222 A1 * | 9/2004 | Vaisanen et al. | 455/78 |
| 2006/0067312 A1 * | 3/2006 | Ross | 370/388 |
| 2006/0194538 A1 * | 8/2006 | Palin et al. | 455/41.2 |
| 2006/0276132 A1 * | 12/2006 | Sheng-Fuh et al. | 455/41.2 |
| 2006/0292986 A1 * | 12/2006 | Bitran et al. | 455/41.2 |
| 2007/0275746 A1 * | 11/2007 | Bitran | 455/509 |
| 2008/0026695 A1 * | 1/2008 | Choi et al. | 455/41.3 |
| 2008/0205365 A1 * | 8/2008 | Russell et al. | 370/341 |
| 2008/0254745 A1 * | 10/2008 | Zhang et al. | 455/41.2 |
| 2009/0137206 A1 * | 5/2009 | Sherman et al. | 455/41.2 |
| 2009/0238158 A1 * | 9/2009 | Lewis | 370/338 |
| 2010/0284380 A1 * | 11/2010 | Banerjee et al. | 370/338 |
| 2012/0129456 A1 * | 5/2012 | Xhafa et al. | 455/63.1 |

* cited by examiner

*Primary Examiner* — Guang Li

(57) ABSTRACT

A method for transmitting one or more first wireless local area network (WLAN) packets and one or more first Bluetooth (BT) packets. The method includes: prior to transmission of the one or more first wireless local area network (WLAN) packets, predicting a first time at which the transmission of the one or more first wireless local area network (WLAN) packets is going to end, and predicting a second time at which reception of one or more second Bluetooth (BT) packets is going to start; and simultaneously transmitting the one or more first wireless local area network (WLAN) packets and the one or more first Bluetooth (BT) packets in response to the first time being predicted to occur prior to the second time.

7 Claims, 14 Drawing Sheets

CO-EXISTANCE OF BLUETOOTH AND WIRELESS LOCAL AREA NETWORK

TECHNICAL FIELD

Embodiments of the present invention relate to Bluetooth (BT) and wireless local area networks (WLANs), and more particularly, to coexistence of BT and WLAN.

BACKGROUND

Wireless Personal Area Networks (WPANs) have been increasingly gaining popularity because of the flexibility and convenience these networks provide. WPAN systems, such as those based on Bluetooth (BT) technology, may be used in a variety of peripheral devices, mobile terminals, etc. by providing short distance wireless links that allow connectivity within a short (e.g., 10 meters) range.

Wireless Local Area Networks (WLANs) have also been increasingly gaining popularity for providing wireless connectivity to devices that are located within a relatively larger geographical area, such as the area covered by a room, building, or a campus, for example. WLAN systems may be based on, for example, Institute of Electrical and Electronics Engineers (IEEE) 802.11 protocols, e.g., IEEE 802.11b protocol released on 1999, IEEE 802.11g protocol released on 2003, or any other appropriate IEEE 802.11 protocol. A WLAN may have a range of 100 meters, and may be utilized to supplement the communication capacity provided by a wired Local Area Network (LAN).

In some instances, it may be desirable to operate a WLAN system in conjunction with a WPAN system to provide users with an enhanced overall functionality. However, co-existence of BT and WLAN may create several challenges. For example, both BT and WLAN radio devices may operate in the 2.4 GHz (2.4000-2.4835 GHz) Industrial, Scientific, and Medical (ISM) unlicensed band, which may create several challenges for co-existence of BT and WLAN.

In other examples, a single device (e.g., a laptop, a cellular phone, etc.) may perform both WLAN and BT transactions. In such a situation not only does the problem of potential interference arise, but also due at least in part to the specifications (e.g., size and power consumption) of the device, WLAN and BT radio devices (e.g., transceivers) may be required to share one or more common antennas and/or common front end processors, which may create additional challenges.

SUMMARY

In various embodiments, the present disclosure provides an apparatus and a method for coexistence of BT and WLAN. More specifically, there is provided, in accordance with various embodiments of the present invention, an apparatus comprising an antenna configured to simultaneously transmit wireless local area network (WLAN) packets and receive Bluetooth (BT) packets, a WLAN transmission system configured to process WLAN packets before said transmission, and a BT reception system configured to process the received BT packets. The apparatus may further comprise a power amplifier configured to amplify WLAN signal before said transmission, and a switch configured to selectively bypass the power amplifier. The apparatus may further comprise a directional coupler operatively coupled between the power amplifier and the antenna and configured to transmit WLAN signals from the WLAN transmission system to the antenna, and further configured to transmit received BT signals from the antenna to the BT reception system.

In various embodiments, the antenna may be further configured to simultaneously receive WLAN packets and BT packets. The apparatus may further comprise a WLAN reception system configured to process the received WLAN packets. The antenna may be further configured to simultaneously receive WLAN packets and transmit BT packets. The apparatus may further comprise a directional coupler operatively coupled to the antenna and configured to transmit the received WLAN packets from the antenna to a WLAN reception system, and further configured to transmit the BT packets from a BT transmission system to the antenna. In various embodiments, the apparatus may further comprise a single pole triple throw (SP3T) switch configured to be operatively coupled to the antenna and to operate in any one of a plurality of positions, and further configured to enable simultaneous transmission of WLAN packets and reception of BT packets while operating in a first position. In various embodiments, the SP3T may be further configured, while operating in a second position, to enable simultaneous reception of WLAN packets and BT packets. The SP3T may be further configured, while operating in a third position, to enable simultaneous reception of WLAN packets and transmission of BT packets.

In various embodiments, there is also provided, in accordance with various embodiments of the present invention, an apparatus comprising an antenna configured to simultaneously transmit Bluetooth (BT) packets and receive wireless local area network (WLAN) packets, a WLAN reception system configured to process the received WLAN packets, and a BT transmission system configured to process the BT packets before said transmission. The antenna may be further configured to simultaneously receive BT packets and WLAN packets. The antenna may be further configured to simultaneously transmit WLAN packets and receive BT packets.

In various embodiments, there is also provided, in accordance with various embodiments of the present invention, a method comprising first predicting, prior to transmitting one or more wireless local area network (WLAN) packets, that the transmission of the one or more WLAN packets is going to end at a first time; second predicting, prior to said transmitting one or more WLAN packets, that a reception of a first one or more Bluetooth (BT) packets is going to start at a second time; and transmitting the one or more WLAN packets while simultaneously transmitting a second one or more BT packets, if the first time occurs prior to the second time. In various embodiments, said transmitting may further comprise transmitting the WLAN packets while simultaneously transmitting the second one or more BT packets, if the transmission of the one or more WLAN packets is predicted to end prior to the start of reception of the first one or more Bluetooth BT packets. The method may further comprise avoiding transmission of the one or more WLAN packets if the second time occurs prior to the first time, and/or issuing a transmission ending synchronization signal in response to ending the transmission of the one or more WLAN packets and transmission of the second one or more BT packets.

In various embodiments, there is also provided, in accordance with various embodiments of the present invention, a method comprising first predicting, prior to receiving one or more wireless local area network (WLAN) packets, that the reception of the one or more WLAN packet is going to end at a first time; second predicting, prior to receiving the one or more WLAN packets, that a transmission of a first one or more Bluetooth (BT) packets is going to start at a second time; and receiving the WLAN packets while simultaneously receiving a second one or more BT packets, if the first time occurs prior to the second time. The method may further comprise transmitting the first one or more BT packets, starting from the second time, if the first time occurs prior to the second time, and/or avoiding transmission of the first one or more BT packets from the second time if the second time occurs prior to the first time. The method may further comprise notifying, if the second time occurs prior to the first time, an access point to not transmit the one or more WLAN packets so as to avoid receiving the one or more WLAN packets before transmitting the first one or more BT packets.

In various embodiments, there is also provided, in accordance with various embodiments of the present invention, a method comprising beginning to receive a wireless local area network (WLAN) frame, detecting contents of a preamble of the WLAN frame, and predicting that the WLAN frame is a beacon frame based at least in part on said detecting. Said detecting may further comprise detecting contents of a preamble signature included in the preamble, wherein the preamble signature includes an originating address, a destination address, and a type of the WLAN frame. The method may further comprise avoiding transmission of one or more Bluetooth packets until the entire WLAN frame is received.

In various embodiments, there is also provided, in accordance with various embodiments of the present invention, a method comprising receiving, from an access point, a wireless local area network (WLAN) frame, the wireless frame including a short preamble and/or a long preamble, and transmitting to the access point, a second WLAN frame in response to said receiving, the transmitted second WLAN frame including an orthogonal frequency-division multiplexing (OFDM) preamble. The method may further comprise transmitting a request to the access point to utilize OFDM preamble in one or more future WLAN frames to be transmitted by the access point.

In various embodiments, there is also provided, in accordance with various embodiments of the present invention, a method comprising receiving one or more wireless local area network (WLAN) packets, predicting an end of reception of one or more BT packets at a first time, the BT packets being received simultaneously with the WLAN packets, predicting a second time to be a start time of a short interframe space (SIFS) acknowledgement that is configured to acknowledge the reception of the one or more WLAN frames, and transmitting the short interframe space (SIFS) acknowledgement if the first time is predicted to occur prior to the second time. The method may further comprise transmitting an extended interframe space (EIFS) acknowledgement if the first time is predicted to occur subsequent to the second time.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Figure 1:
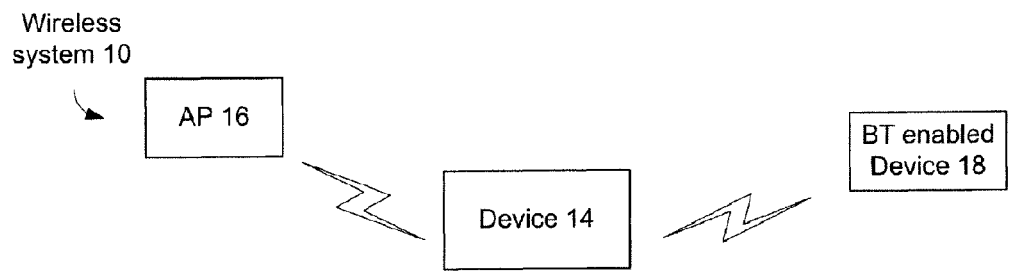
FIG. 1 schematically illustrates an exemplary wireless system.

FIG. 1 schematically illustrates an exemplary wireless system 10. The system 10 includes a device 14 that is configured to wirelessly communicate with an access point AP 16 of a WLAN network. Thus, the AP 16 and the device 14 may be a part of a WLAN, and may wirelessly communicate using an appropriate WLAN protocol (e.g., IEEE 802.11b, IEEE 802.11g, etc.). The device 14 is configured to wirelessly communicate with a BT enabled device 18 in accordance with a BT specification (e.g., Bluetooth specification version 2.0 released on 2004, or any other appropriate version of the BT specification). As will be readily understood by those skilled in the art, the device 14 may also communicate with other devices (not illustrated in FIG. 1) using WLAN, BT, and/or any other appropriate wired and/or wireless protocol.

The device 14 may be, for example, a laptop configured to communicate with a BT enabled wireless keyboard (or a any other BT enabled peripheral like a mouse, a printer, a camera, a headphone, etc.) and with the WLAN AP 16. The device 14 may be a cell phone configured to communicate with a BT enabled headphone and also with the AP 16.

Front End Processing

Figure 2:
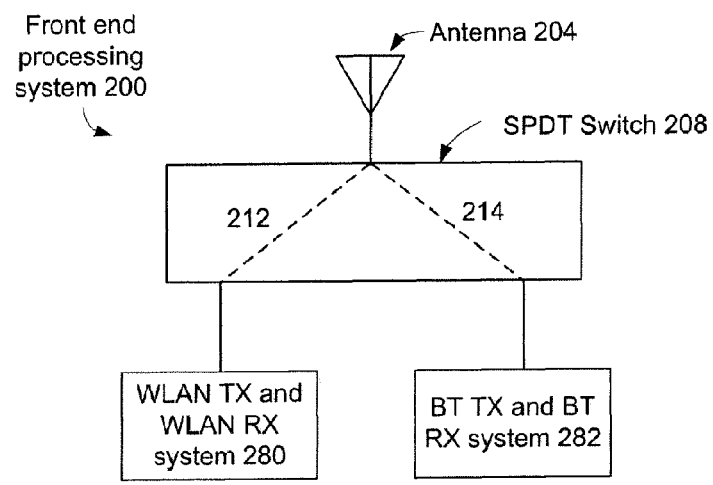
FIG. 2 schematically illustrates an exemplary front end processing system.

FIG. 2 schematically illustrates an exemplary front end processing system 200. The front end processing system 200 may be present in a device (e.g., device 14 of FIG. 1) that may be configured to wirelessly communicate with a WLAN device (e.g., AP 16) using an appropriate WLAN protocol and a Bluetooth enabled device (e.g., device 18) using an appropriate Bluetooth specification.

The system 200 includes an antenna 204 configured to trans-receive wireless communication to and/or from the AP 16 and/or the BT enabled device 18. Thus, the antenna 204 may be configured to transmit and/or receive WLAN and/or BT frames and packets.

The system 200 also includes a single pole double throw (SPDT) switch 208 operatively coupled to the antenna 204. The switch may be configured to be either in position 212 or at position 214, as illustrated by the dotted lines in FIG. 2. When in position 212, the switch 208 operatively couples the antenna 204 with a WLAN transmission (TX) and reception (RX) system 280, and the device 14 may transmit and/or receive WLAN packets to and/or from AP 16 utilizing the antenna 204. When in position 214, the switch 208 operatively couples the antenna 204 with a BT TX and RX system 282, and the device 14 may transmit and/or receive BT packets to and/or from the BT enabled device 18 utilizing the antenna 204.

Thus, at any given time, the device 14 may be able to transmit and/or receive either WLAN packets or BT packets, based at least in part on the position of the switch 208. However, using the system 200, it may not be possible to transmit and/or receive WLAN and BT packets simultaneously.

Figure 3:
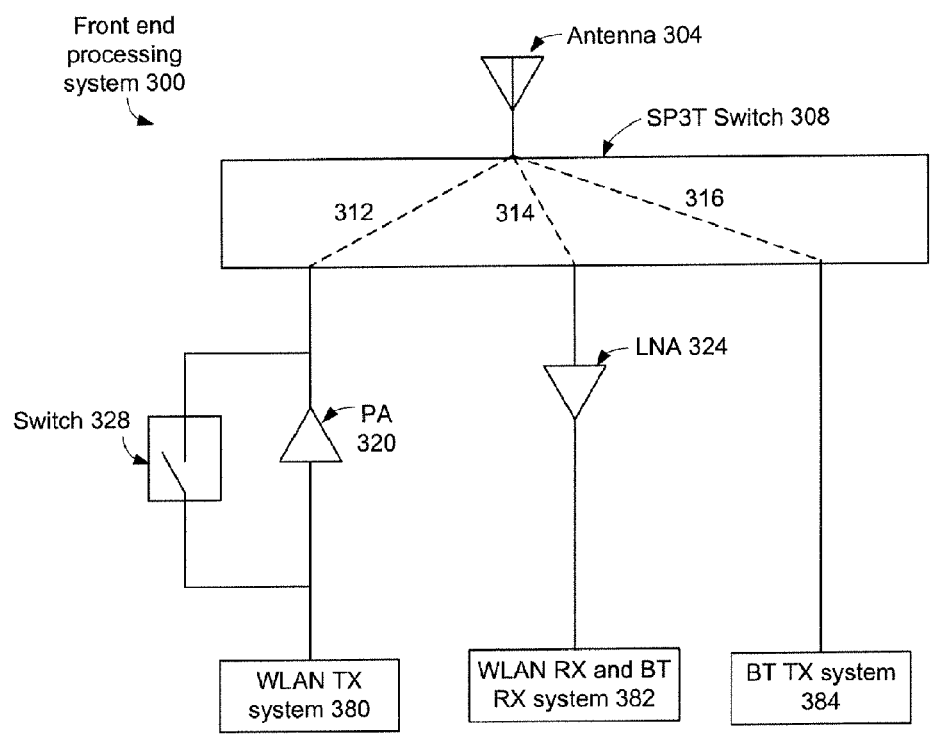
FIG. 3 schematically illustrates an exemplary front end processing system.

FIG. 3 schematically illustrates an exemplary front end processing system 300. The front end processing system 300 may be present in a device (e.g., device 14 of FIG. 1) that may be configured to wirelessly communicate with a WLAN device (e.g., AP 16) using an appropriate WLAN protocol and a Bluetooth enabled device (e.g., device 18) using an appropriate Bluetooth specification.

The system 300 includes an antenna 304 coupled to a single pole triple throw (SP3T) switch 308. The SP3T switch 308 may be configured to be in any one of three positions (312, 314 or 316) at any given time.

In various embodiments, when the SP3T switch 308 is at position 312, the antenna 304 is operatively coupled to a WLAN TX system 380 through the switch 308 and through a power amplifier (PA) 320. In various embodiments, a switch 328 may also be coupled to both ends of the power amplifier 320 and may be configured to selectively bypass the PA 320, whenever required. For example, the PA 320 may be utilized to amplify WLAN signals before transmission through the antenna 304. However, if low power WLAN transmission is desired, the PA 320 may be bypassed utilizing switch 328.

In various embodiments, when the SP3T switch 308 is at position 314, the antenna 304 may be coupled to a WLAN RX and BT RX system 382 through the switch 308 and through a low noise amplifier (LNA) 324, which may be utilized to amplify the received WLAN and/or BT signals, and/or reduce a noise figure of the receiver subsystems. Thus, when the switch 308 is at position 314, the device 14 of FIG. 1 may receive WLAN packets and/or BT packets through the antenna 304, from the AP 16 and/or the BT enabled device 18, respectively. In various embodiments, the reception of the WLAN packets and the BT packets may be simultaneous, i.e., the front end processing system 300 may be configured to simultaneously receive WLAN packets and the BT packets. Once the WLAN and/or the BT packets are received at the WLAN RX and BT RX system 382, the packets may be processed using a WLAN and/or BT processing unit (not illustrated in FIG. 3), as is well known to those skilled in the art.

In various embodiments, when the SP3T switch 308 is at position 316, the antenna 304 may be operatively coupled to a BT TX system 384, and the device 14 may transmit BT packets to the BT enabled device 18 utilizing the antenna 308.

Thus, in various embodiments, the front end processing system 300 may be configured to allow simultaneous reception of WLAN packets and the BT packets (when switch 308 is at position 314), and also transmission of WLAN packets (when switch 308 is at position 312) and BT packets (when switch 308 is at position 316).

As will be readily understood by those skilled in the art that the switch 328, PA 320 and/or the LNAA 324 may be optional, and in various embodiments, one or more of those components may not be present in the front end processing system 300 (or any other front end processing system disclosed herein later).

Figure 4:
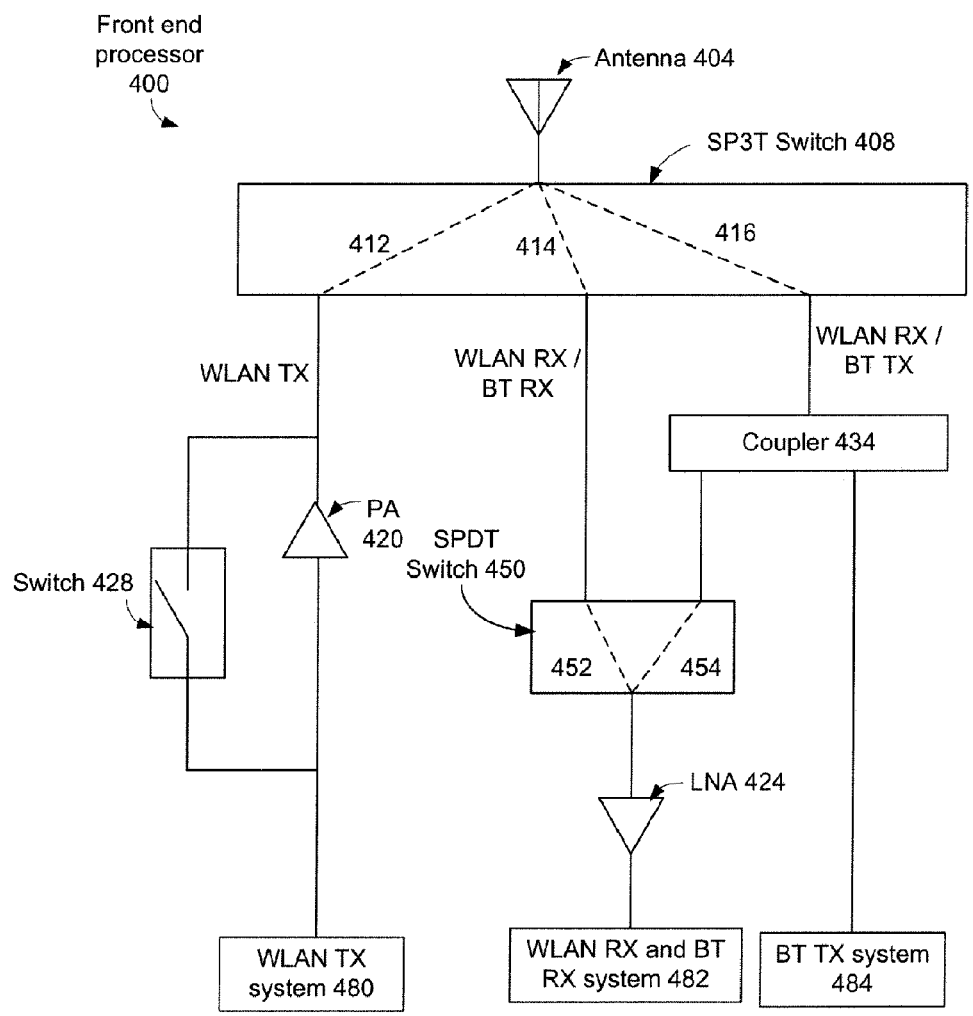
FIG. 4 schematically illustrates another exemplary front end processing system.

FIG. 4 schematically illustrates an exemplary front end processing system 400. The front end processing system 400 may be present in a device (e.g., device 14 of FIG. 1) that may be configured to wirelessly communicate with a WLAN device (e.g., AP 16) using an appropriate WLAN protocol and a Bluetooth enabled device (e.g., device 18) using an appropriate Bluetooth specification.

Similar to the front end processing system 300 of FIG. 3, in various embodiments, the system 400 may include an antenna 404 coupled to a SP3T switch 408 that is configured to be in any one of three positions (412, 414 or 416) at any given time. When the SP3T switch 408 is at position 412, the antenna 404 may be coupled to a WLAN TX system 480 through the switch 408 and a power amplifier 420. In various embodiments, a switch 428 may be configured to selectively bypass the power amplifier 420, whenever required.

The system 400 also includes a SPDT switch 450 operatively coupled to the SP3T switch 408 such that when the switch 408 is at position 414, a port of the SPDT switch 450 is operatively coupled to the antenna 404 through the SP3T switch 408. The system 400 also includes a power divider or directional coupler 434 operatively coupled to the SP3T switch 408 such that when the switch 408 is at position 416, a port of the coupler 434 is operatively coupled to the antenna 404 through the SP3T switch 408. A second port of the coupler 434 is coupled to a port of the SPDT switch 450, and another port of the coupler 434 is coupled to a BT TX system 484. An output of the SPDT switch 450 is coupled to a WLAN RX and BT RX system 482, optionally through an LNA 424. In various embodiments, the SPDT switch 450 may be configured to be, at any given time, either in position 452 or in position 454, such that the SPDT switch 450 operatively couples an output of the antenna 408 or an output of the coupler 434 to the WLAN RX and BT RX system 482, respectively.

In various embodiments, whenever it is desirable to transmit WLAN packets, the WLAN TX system 480 may transmit the same (optionally after amplification utilizing the PA 420) through the SP3T switch 408 (in position 412) and the antenna 404.

When the SP3T switch is at position 414, the antenna may receive WLAN packets and/or BT packets (i.e., may receive WLAN packets and BT packets simultaneously), and transmit the WLAN packets and/or BT packets to the WLAN RX and BT RX system 482 through SPDT switch 450 (operated at 452 position) and LNA 424. Thus, the front end processing system 400 may be configured to simultaneously receive WLAN packets and BT packets.

When the SP3T switch is at position 416, the antenna 404 may be configured to transmit BT packets and/or receive WLAN packets. For example, while the SP3T switch is at position 416, the coupler 434 may operatively couple the BT TX system 484 to the antenna 404 through switch 408, thereby allowing BT packet transmission. In various embodiments, the coupler may also be configured to receive WLAN packets received by the antenna 404 and transmit the received WLAN packets to the WLAN RX and BT RX system 482 through the SPDT switch 450 (operated at position 454) and the LNA 454. Thus, the front end processing system 400 may be configured to simultaneously transmit BT packets and receive WLAN packets by appropriately configuring the SP3T switch 408 (in position 416), SPDT switch 450 (in position 454), and the directional coupler 434.

Figure 5:
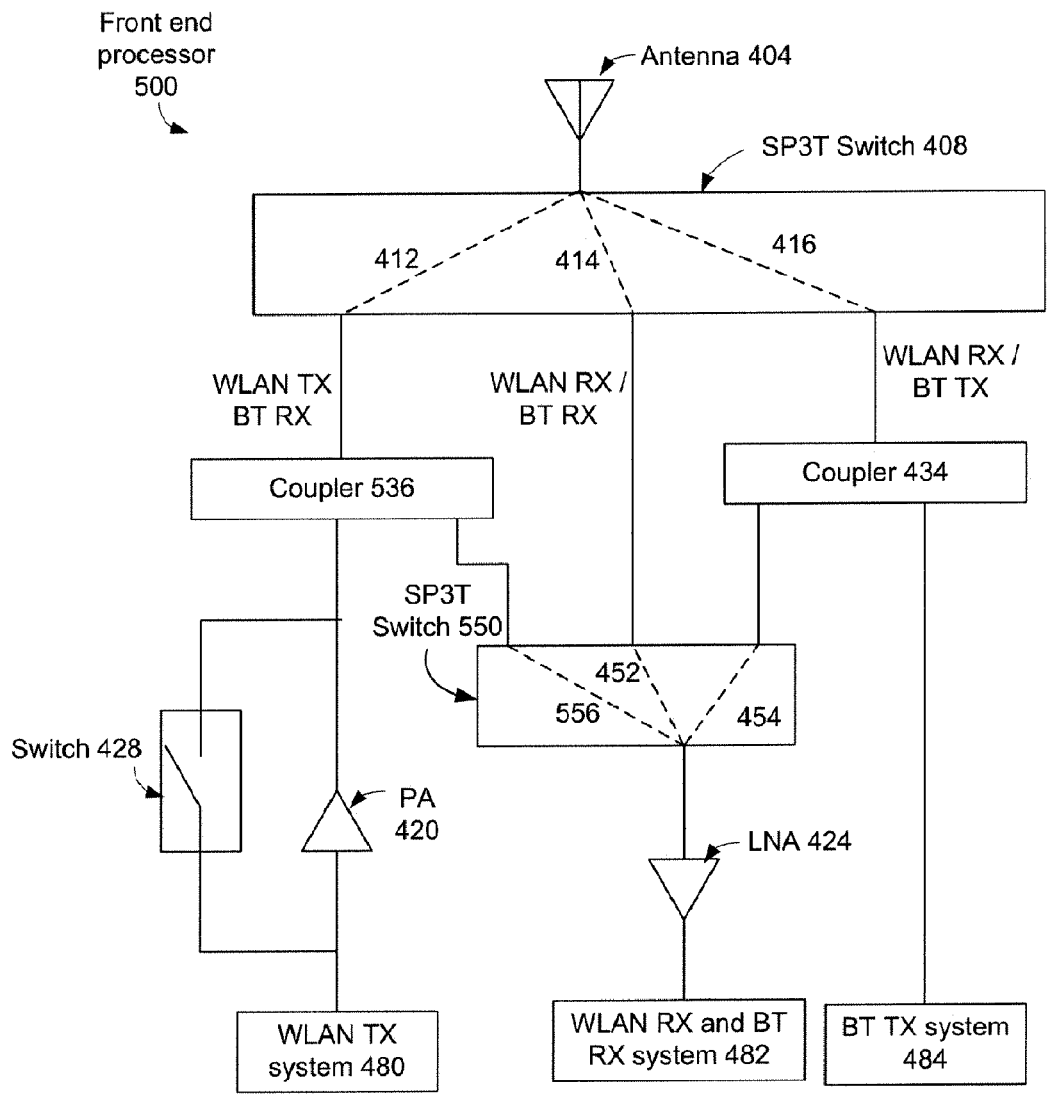
FIG. 5 schematically illustrates another exemplary front end processing system.

FIG. 5 schematically illustrates an exemplary front end processing system 500. The system 500 of FIG. 5 may be at least in part similar to the system 400 of FIG. 4, and the components of system 500 that are similar to that in the system 400 has been denoted by same reference characters in FIG. 5 as in FIG. 4.

For example, similar to the system 400 of FIG. 4, the system 500 of FIG. 5 may include antenna 404, SP3T switch 408, PA 420, switch 428, WLAN TX system 480, WLAN RX and BT RX system 482, BT TX system 484, LNA 424, and/or coupler 434.

Instead of the SPDT switch 450 of FIG. 4, the system 500 includes a SP3T switch 550 (operating in position 556, 452 or 454), as illustrated in FIG. 5. Also, the system 500 includes a power divider or directional coupler 536 operatively coupled between the SP3T switch 408 and the PA 420, a port of which may be operatively coupled to a port of the ST3T switch 550.

Referring again to FIG. 5, when the SP3T switch 408 is at position 412, the WLAN TX system 480 may transmit WLAN packets (to the AP 16, for example) through the coupler 536, switch 408 and antenna 404 (possibly after amplification by the PA 420). At the same time (i.e., while switch 408 is at position 412), the antenna 404 may receive BT packets (from the BT enabled device 18, for example) and transmit the received BT packets to the WLAN RX and BT RX system 482 through the coupler 536, SP3T switch 550 (operating at position 556), and LNA 424. That is, by utilizing the front end system 500, it may be possible to transmit WLAN packets simultaneously with receiving BT packets.

In various embodiments, at any given time, if the front end processing system 500 is transmitting WLAN packets but not simultaneously receiving any BT packets, the device 14 may utilize the PA 420 to amplify the WLAN signals before such transmission occurs. However, if the front end processor 500 is transmitting WLAN packets simultaneously with receiving BT packets, the device 14 may bypass the PA 420 (by utilizing the switch 428), i.e., not utilize the PA 520 to amplify the WLAN signals before transmission. That is, during simultaneous transmission of WLAN packets and reception of BT packets, the transmission of WLAN packets may be performed at relatively lower power to avoid possibilities of interference with the reception of the BT packets.

In various embodiments, the front end processing system 500 may also simultaneously receive BT and WLAN packets by configuring SP3T switch 408 (at position 414), SP3T switch 550 (at position 452) and LNA 424, as has been previously discussed herein with respect to FIG. 4.

In various embodiments, the front end processing system 500 may also simultaneously receive WLAN packets and transmit BT packets by configuring SP3T switch 408 (at position 416), coupler 434, SP3T switch 550 (at position 454) and LNA 424, as has been previously discussed herein with respect to FIG. 4.

Figure 6:
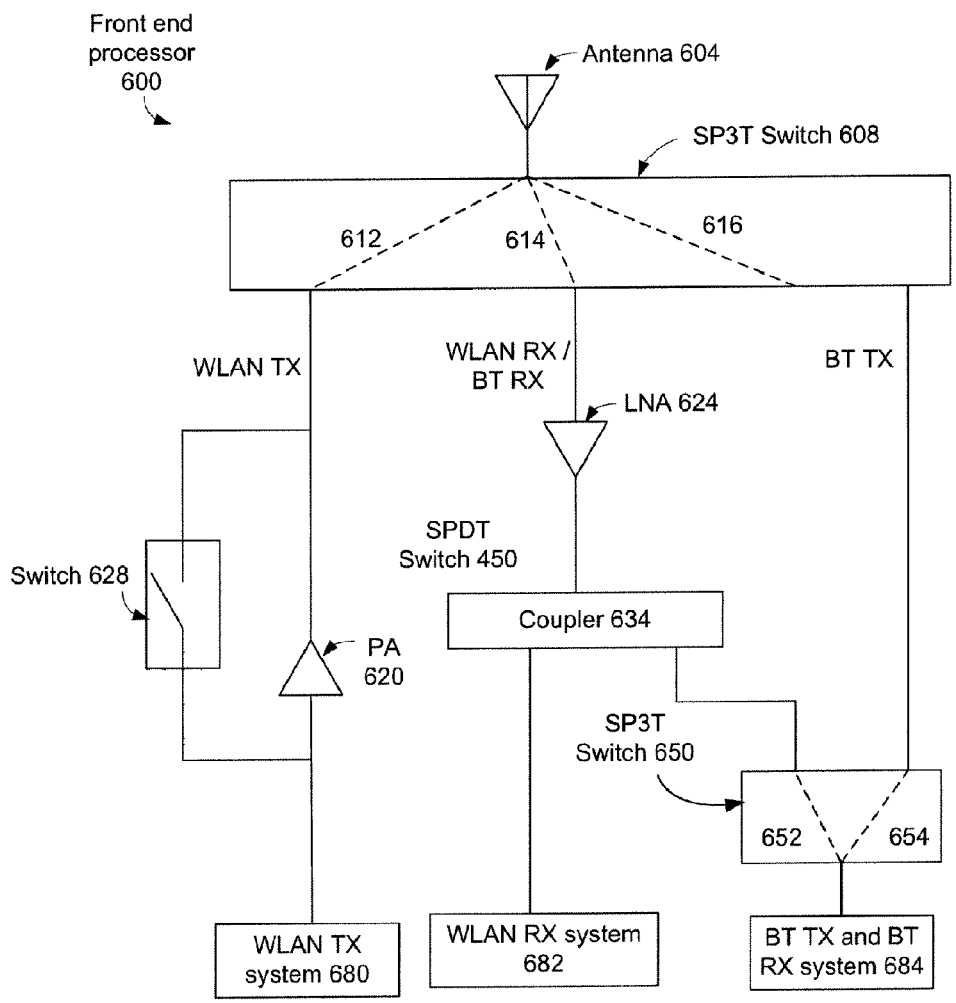
FIG. 6 schematically illustrates another exemplary front end processing system.

FIG. 6 schematically illustrates an exemplary front end processing system 600. The individual components of FIG. 6 are at least in part similar to those discussed with respect to FIGS. 3-5, and the interconnection between the components in FIG. 6 will be apparent to those skilled in the art based on the disclosure and teachings provided herein, and hence, a detailed description of the same is omitted herein.

In various embodiments, when the SP3T switch 608 is at position 612, the WLAN TX system 680 may transmit WLAN packets through PA 620 (or bypassing the PA 620 by utilizing switch 628 while operating in a low WLAN transmission power mode). In various embodiments, when the SP3T switch 608 is at position 616, the BT TX and RX system 684 may transmit BT packets through SP3T switch 650 (operating in position 654) and antenna 604.

When the SP3T switch 608 is at position 614, the antenna 604 may receive WLAN and BT packets. The WLAN RX system 682 may receive the WLAN packets received by the antenna 604, through the LNA 624 and coupler 634. In various embodiments, the BT TX and BT RX system 684 may also simultaneously receive BT packets received by the antenna 604, through the LNA 624, coupler 634, and SP3T switch 650 (operating in position 652). Thus, in various embodiments, it may be possible to simultaneously receive BT and WLAN packets utilizing the system 600 of FIG. 6.

Bluetooth Hoping Pattern Control

Figure 7A:
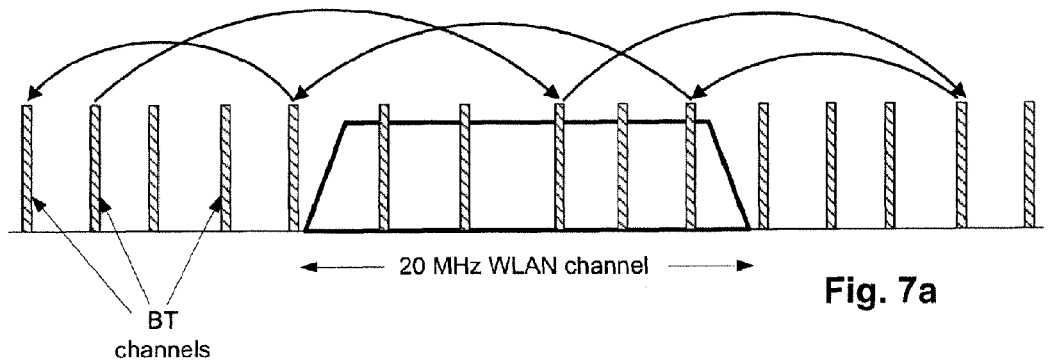
FIG. 7a illustrates an exemplary WLAN channel and a plurality of BT channels utilizing random hopping.

WLANs (e.g., IEEE 802.11b/g) and Bluetooth usually utilize the same 2.4 GHz ISM frequency band for communication, as is well known to those skilled in the art. Typically, in the allowed frequency band, a WLAN system may utilize one or more 20 MHz channels. On the other hand, Bluetooth device may use 79 of the 83.5 available channels in the 2.4 GHz band, hopping across these channels in a random (or pseudo-random) fashion and at a rate of, for example, 1600 times per second. FIG. 7a illustrates an exemplary WLAN channel and a plurality of BT channels utilizing random hopping. Specifically, FIG. 7a illustrates one 20 MHz WLAN channel, and a plurality of BT channels. Although only about 12 BT channels are illustrated in FIG. 7, there may be more BT channels available. A conventional BT system may randomly hop across these BT channels at regular interval, and an exemplary hopping pattern is illustrated by the curved lines with arrows in FIG. 7a.

As illustrated in FIG. 7a, one or more of the BT channels may overlap with the channel used by the WLAN. When BT is used in conjunction with WLAN (e.g., a single device employing both BT and WLAN mode of communication), this overlapping may create interference and possibilities of collision among BT and WLAN packets.

Figure 7B:
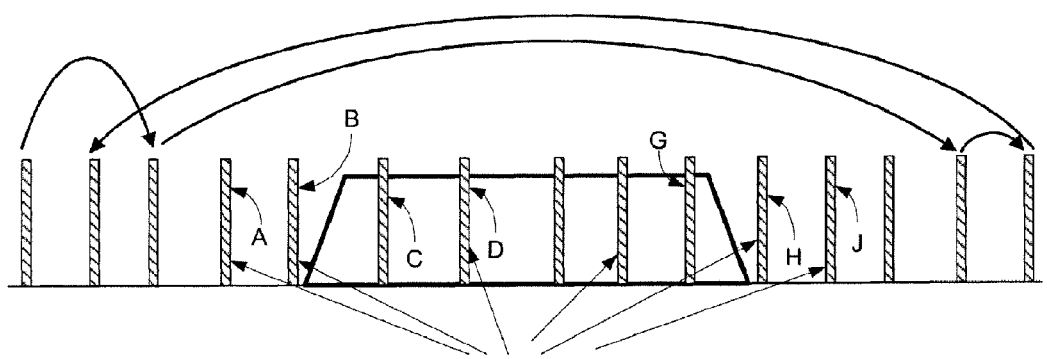
FIG. 7b illustrates an exemplary WLAN channel and a plurality of BT channels utilizing adaptive frequency hopping (AFH).

FIG. 7b illustrates an exemplary WLAN channel and a plurality of BT channels utilizing adaptive frequency hopping (AFH). With AFH, a device may identify the channel utilized by WLAN, and avoid those BT channels that overlap with WLAN channel. For example, BT channels C, D, . . . , G in FIG. 7b overlaps with the WLAN channel, and according to an AFH system, these BT channels may not be used for BT communication to reduce chances of collision and interference among BT and WLAN packets.

In various embodiments, a device may also identify those BT channels that are near to the WLAN channel, and may decide to avoid these BT channels as well. For example, BT channels A, B, H and J may be near to the WLAN channel, and these BT channels may also not be used for BT communication to further reduce chances of collision and interference among BT and WLAN packets. Thus, these BT channels may act similar to a guard band or avoidance region, and sufficiently separate the WLAN channels from the BT channels that are used for BT hopping.

In various embodiments, although AFH may reduce chances of collision and interference among BT and WLAN packets, AFH may also reduce the number of available channels used for BT communication by creating the guard band or avoidance region.

Figure 8A:
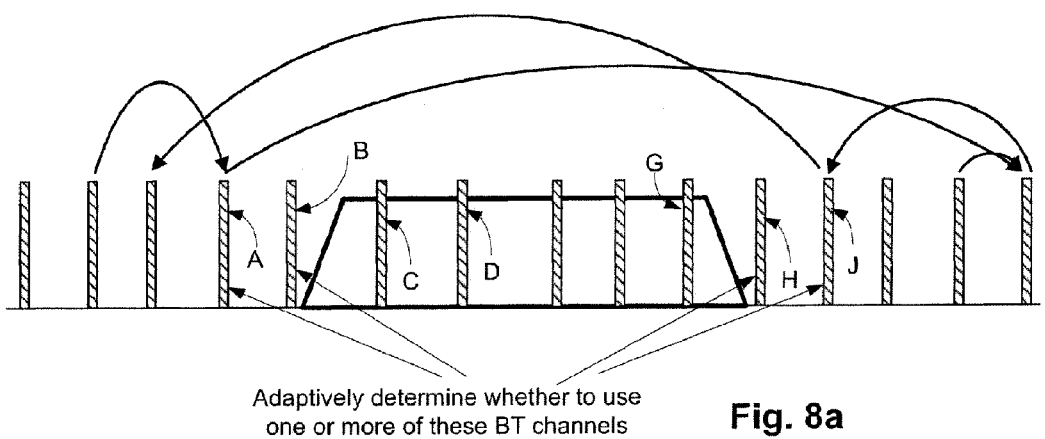
FIG. 8a illustrates an exemplary WLAN channel and a plurality of BT channels utilizing adaptive hopping pattern control.

FIG. 8a illustrates an exemplary WLAN channel and a plurality of BT channels utilizing adaptive hopping pattern control. Similar to an AFH, in FIG. 8a, those BT channels that overlap with the WLAN channel may not be utilized for BT communication. However, in various embodiments, the BT channels that may be used as guard band channels in the avoidance region may be determined adaptively. That is, there may be some BT channels (e.g., A, B, C and D) that may be close to the WLAN channel. However, the decision to use one or more of these BT channels for BT communication may be taken adaptively, based at least in part on, for example, WLAN signal strength, BT signal strength, impact of adjacent channel rejection, etc. For example, if the WLAN signal and/or the BT signals are determined to be relatively weak, then the guard band channels or the avoidance region may be made relatively larger (e.g., by including channels A, B, H, and J in the guard band) to reduce possible interference to the WLAN signal. However, in other situations, it may be desirable to use a shorter guard band or avoidance region, and accordingly, for example, channels A and J may be used for BT communications (and possibly prohibiting BT channels B and H from participating in BT communications and including these channels in the guard band or avoidance region).

Figure 8B:
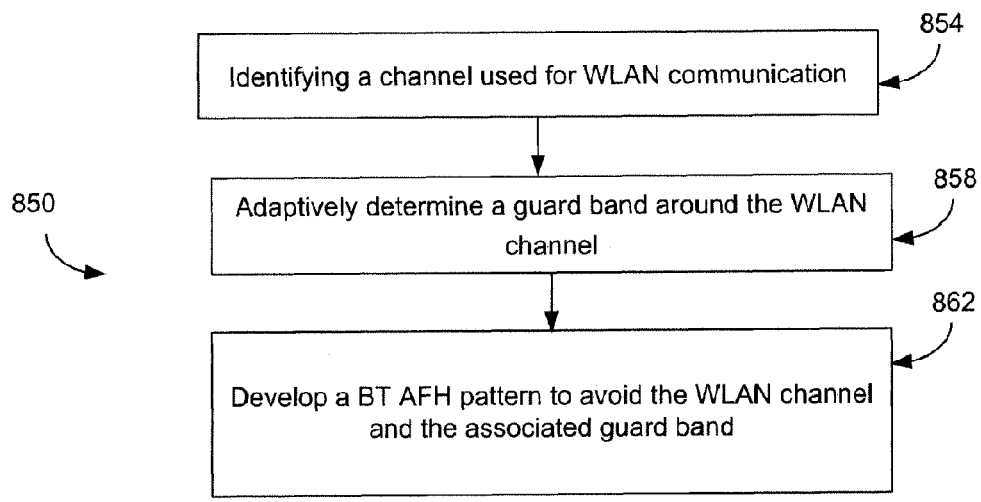
FIG. 8b illustrates a method for Bluetooth hoping pattern control.

FIG. 8b illustrates a method 850 for Bluetooth hoping pattern control. Referring to FIGS. 8a and 8b, the method 850 may include, at 854, identifying, by the device 14, a channel used by the device 14 and/or the AP 16 for WLAN communications. At 858, a guard band or avoidance region around the WLAN channel may be adaptively determined by the device 14. At 862, the device 14 may develop a BT AFH pattern that avoids BT channels that overlap with the WLAN channel and/or are included in the associated guard band or avoidance region.

Oscillator Calibration to Meet BT Low Power Operation (LPO) Requirement

Figure 9:
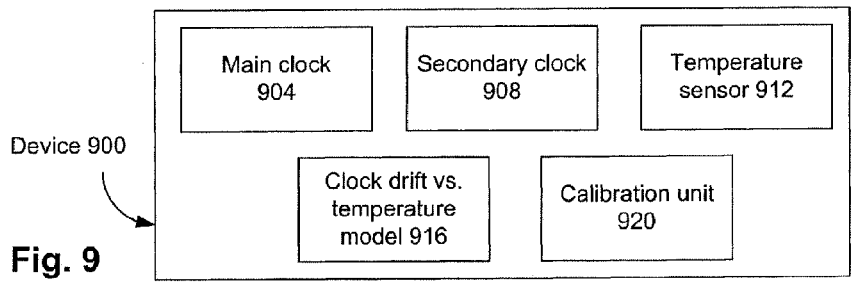
FIG. 9 schematically illustrates an exemplary device that is capable of supporting BT communication.

FIG. 9 schematically illustrates an exemplary device 900 that is capable of supporting BT communication. For example, the device 900 of FIG. 9 may be similar to the devices 14 and/or 18 of FIG. 1, and may be capable of transmitting and/or receiving BT packets. In various embodiments, the BT device 900 may operation in an active (or regular) mode, or in one of several low power mode (e.g., sniff mode, hold mode, park mode, etc.), as is well known to those skilled in the art. In active mode, the accuracy of clock signal required for the device 900 may be more than that required during a low power operation (LPO), as is also well known to those skilled in the art. For example, while operating in the active mode, the device 900 may require a clock accuracy of at least 5-10 parts-per-million (ppm), but while operating in a low power mode, the device 900 may require a clock accuracy of at least 250 ppm. Thus, the active mode may require a relatively more accurate clock signal as compared to the low power mode.

Referring again to FIG. 9, the device 900 includes a main clock 904 (e.g., a system clock) and a secondary clock 908. In one embodiment, the main clock 908 has relatively more accuracy as compared to the secondary clock 908, and also draws more power than the secondary clock 908. The secondary clock 908 may be, for example, an oscillator (e.g., a ring oscillator) that draws less current than the main clock 904. In various embodiments, the main clock 908 may be utilized while the device 900 is operating in the active mode. During a low power mode, the secondary clock 908 may be used in lieu of the main clock for one or more BT operations of the device 900 to save power (as the secondary clock 908 may draw less power than the main clock 904). That is, in the low power mode, the main clock 904 may be usually switched off to save power.

However, in various embodiments, the secondary clock 908 may not have the clock accuracy (e.g., 250 ppm accuracy) required for low power BT operation. Accordingly, during a low power operation, it may be desirable to periodically calibrate the secondary clock 908 such that the secondary clock 908 meets the BT low power operation clock signal requirement.

As is well known to those skilled in the art, variations in process, voltage and temperature (PVT) may be responsible, at least in part, for inaccuracies in an oscillator clock signal. Thus, in various embodiments, it may be desirable to reduce the PVT variations of the secondary clock 908 so that the secondary clock signals meet the accuracy requirement of the low power operation of the device 900.

The process variation of the secondary clock 908 may occur during the manufacturing of the secondary clock 908, and may not considerably change once the secondary clock 908 has been manufactured. Thus, the secondary clock 908 may be calibrated using a relatively more accurate clock (e.g., the main clock 904) to counter or reduce process related errors in the secondary clock 908. In various embodiments, the calibration of the secondary clock 908 may be performed using, for example, a calibration unit 920 included in the device 900.

In various embodiments, the clock signal of the secondary clock 908 may drift with changes in the clock temperature, as is well known in the art. For example, there may be a drift of up to 500 ppm/° C. Such drift of clock signal with a change in the device temperature may be modeled and stored as clock drift vs. temperature model 916 in an appropriate memory location in the device 900. In various embodiments, the device 900 may include a temperature sensor 912. It may be desirable to periodically recalibrate the secondary clock 908 to remove or reduce the effects of temperature variation.

While operating in low power mode, the BT operations of the device 900 may be clocked by the secondary clock 908, and the main clock 904 may be usually switched off. In various embodiments, the calibration unit 920 may periodically (e.g., every 500 millisecond (ms)) receive the device 900's temperature from the temperature sensor 912. If the calibration unit 920 notices significant differences in the current temperature from the last temperature reading, the calibration unit 920 may infer that the secondary clock 908 needs a recalibration because of possible temperature drift. In various embodiments, the calibration unit 920 may, based at least in part on the clock drift vs. temperature model 916, decide the amount of re-calibration required in the secondary clock 908 to counter the temperature changes. In various embodiments, the calibration unit 920 may also wake up the main clock 904 for a short duration (e.g., 5 ms) and recalibrate the secondary clock 908 utilizing the main clock 904. Recalibration of a clock is well known to those skilled in the art, and hence, will not be discussed in detail herein.

As is well known to those skilled in the art, variation in a voltage applied to the secondary clock 908 may also result in variation in the associated clock signal. In various embodiments, a voltage control circuit (not illustrated in FIG. 9) may ensure minimal variation in voltage supplied to the secondary clock 908, to avoid any drift in the secondary clock signal due to voltage variation. In various embodiments, the device 900 may include a voltage sensor (not illustrated in FIG. 9), which may measure any variation in the secondary clock voltage. In case any significant voltage variation is observed, recalibration of the secondary clock 908 may be performed.

Figure 10:
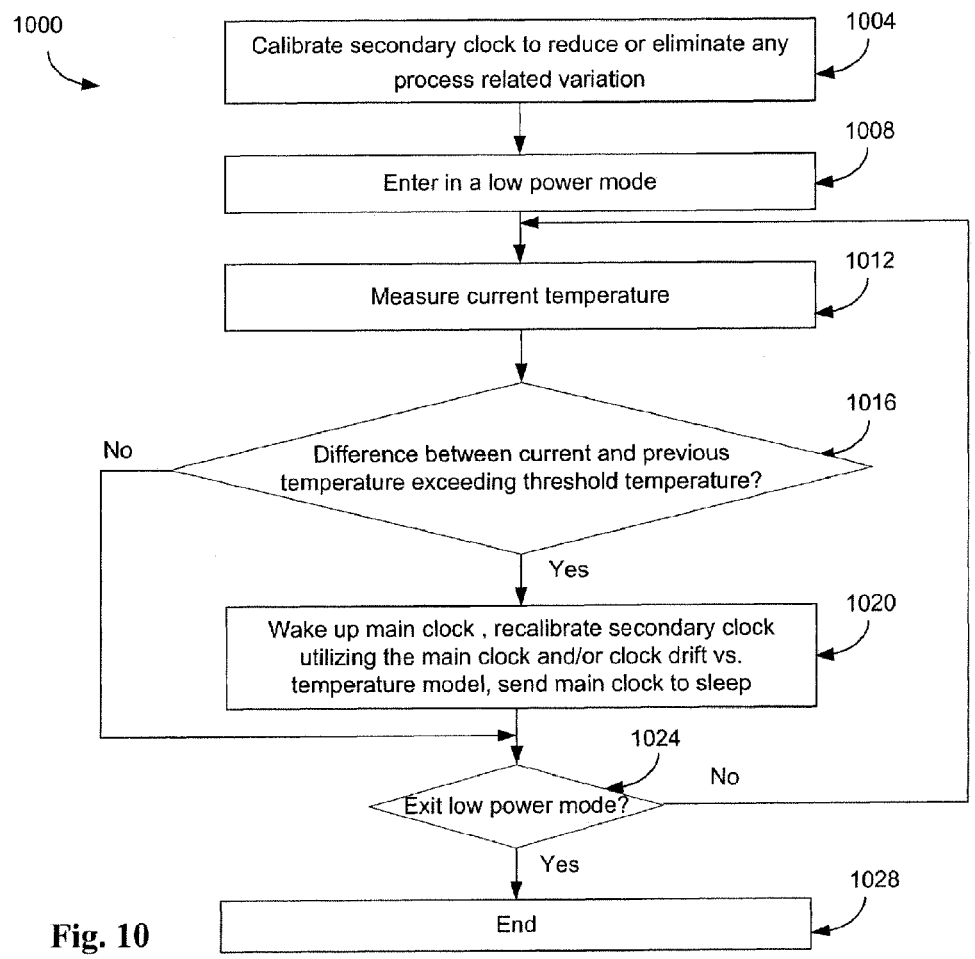
FIG. 10 illustrates an exemplary method for recalibrating a secondary clock of FIG. 9.

FIG. 10 illustrates an exemplary method 1000 for recalibrating the secondary clock 908 of FIG. 9. Referring to FIGS. 9 and 10, at 1004, the secondary clock 908 may be calibrated to reduce or eliminate any process related variation. The calibration at 1004 may be performed, for example, any time after the manufacturing the secondary clock 908 (e.g., immediately after manufacturing the secondary clock 908, after installing the secondary clock 908 in device 900, each time the device 900 is restarted, etc.).

At 1008, the device 900 may enter a low power mode for a variety of reasons well known to those skilled in the art. Upon entering the low power mode, the main clock 904 may be sent to sleep (i.e., disabled or turned off), and one or more BT components in the device 900 may be clocked by the secondary clock 908. At 1012, the temperature sensor 912 may measure the temperature of one or more components of the device 900. At 1016, the calibration unit 920 may determine a difference between the current and a previous reading of the temperature sensor 912, and compare the difference with a threshold temperature level. If the difference exceeds the threshold, at 1020, the main clock 904 may be woken up from sleep mode (i.e., enabled or turned on), and the calibration unit 920 may recalibrate the secondary clock 908 utilizing the main clock 904 and/or the clock drift vs. temperature model 916, and the main clock 904 may be re-sent to the sleep mode (i.e., disabled or turned off) upon successful recalibration. In case the difference does not exceed the threshold at 1016, the recalibration operation at 1020 may be bypassed.

At 1024, a determination may be made if the device 900 needs to exit the low power mode, and if so, the device 900 may exit the low power mode (to enter, for example, an active mode), thereby ending the method of FIG. 10. If the device 900 continues to remain in the low power mode, the temperature sensor 912 may continue, at 1012, to periodically measure the device 900's temperature.

Arbitration

In case of co-existence of BT and WLAN, the two different networks may share various resources (e.g., front end processing system, antenna, medium, etc.). For both BT and WLAN to operate satisfactorily in such a co-existence environment, it may be necessary to arbitrate access to one or more shared resources between the two (BT and WLAN) networks. Several arbitration schemes are well known to those skilled in the art (e.g., packet traffic arbitration (PTA)) that may provide collaboration between Bluetooth and WLAN up to a certain degree.

Some of the known arbitration schemes may be based on packets and transactions. For example, during an arbitration scheme, a BT circuitry and a WLAN circuitry (included in, for example, device 14 of FIG. 1) may negotiate which of the packets (BT or WLA) may be currently transmitted, and based upon this negotiation, the BT and/or the WLAN may be provided time slots to transmit respective packets.

In various embodiments, it may be desirable to incorporate an importance of the BT and/or WLAN packets, along with an importance of BT and WLAN transfers while performing the arbitration process. For example, a WLAN transfer may be associated with transmitting a plurality of WLAN packets. That is, a plurality of WLAN packets may be clubbed together (based, for example, on the type or association of the packets) as a single transfer, and it may be desirable (if possible) to transmit the entire WLAN transfer without any interruption (caused, for example, by transmission of BT packets).

Figure 11:
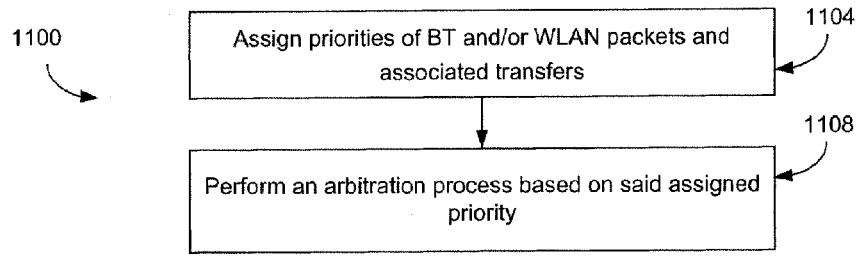
FIG. 11 illustrates an exemplary method for arbitration among BT and WLAN.

FIG. 11 illustrates an exemplary method 1100 for arbitration among BT and WLAN. The method 1100 may include, at 1104, assigning priorities of BT and/or WLAN packets and priorities of associated transfers. For example, a priority of a transfer that is to be started may be different (e.g., relatively lower) than a transfer that has always been started. Thus, if a WLAN transfer (comprising transferring plurality of WLAN packets associated with the single transfer) has already started, if may be desirable to complete the transfer before starting a BT transfer. Accordingly, the current WLAN transfer may be assigned a higher priority as compared to BT transfer. At the least, assignment of priority at 1104 may be based at least in part on the knowledge, if available, of BT and/or WLAN transfers that are currently being undertaken. At 1108, an arbitration process may be performed based at least in part on the priority assigned at 1104.

Transmission Ending Synchronization

In various embodiments, one or more of the front end processing systems (e.g., those previously discussed herein with reference to FIGS. 3-6) may allow certain degree to simultaneous BT and WLAN operations. For example, in various embodiments, a front end processing system may allow simultaneous transmission of BT and WLAN packets (i.e., simultaneous BT TX and WLAN TX), and may also allow simultaneous reception of BT and WLAN packets (i.e., simultaneous BT RX and WLAN RX). The front end processing system may also allow simultaneous transmission of BT packets and reception of WLAN packets (i.e., simultaneous BT TX and WLAN RX), and may also allow simultaneous reception of BT packets and transmission of WLAN packets (i.e., simultaneous BT RX and WLAN TX).

In various embodiments, during certain links conditions, simultaneous (BT TX and WLAN RX) and simultaneous (BT RX and WLAN TX) may create interference among BT and WLAN signals. However, in some of these link conditions, simultaneous (BT TX and WLAN TX) and simultaneous (BT RX and WLAN RX) may not create any such interference (or create relatively lower interference).

Accordingly, it may be desirable to simultaneously perform (BT TX and WLAN TX) and/or also simultaneously perform (BT RX and WLAN RX), but not simultaneously perform (BT TX and WLAN RX) and/or not simultaneously perform (BT RX and WLAN TX).

Thus, if BT and WLAN packets are simultaneously transmitted, it may be desirable to end transmission of both BT and WLAN packets before starting reception of BT and/or WLAN packets. Similarly, if BT and WLAN packets are simultaneously received, it may be desirable to end reception of both BT and WLAN packets before starting transmission of BT and/or WLAN packets.

Figure 12A:
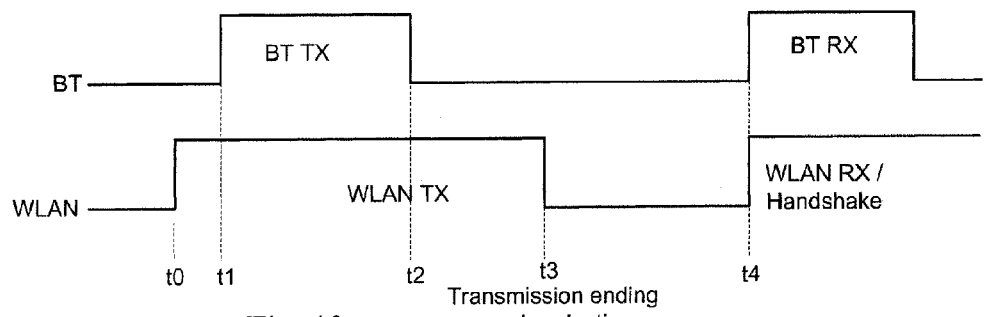
FIG. 12a schematically illustrates an exemplary timing diagram for BT and WLAN packet transmission and/or reception by a device of FIG. 1.

FIG. 12a schematically illustrates an exemplary timing diagram for BT and WLAN packet transmission and/or reception by the device 14 of FIG. 1. Referring to FIG. 12a, BT packets may be transmitted between time t1 and t2, and BT packets may be scheduled to be received from time t4 onwards. Also, transmission of WLAN packets may start at time to.

In various embodiments, device 14 may predict (based in part, for example, the assignment of BT slots), at or before time to, that the next BT reception is scheduled to start at or near time t4. Also, at or before time t0, the device 14 may predict (based in part, for example, on WLAN transmission and/or reception rate and/or WLAN payload) how long the next WLAN transmission is going to last (i.e., may predict when the next WLAN transmission would end).

As previously discussed, it may be desirable to avoid simultaneous BT reception and WLAN transmission. Thus, in various embodiments, at time t0, if it is predicted that the WLAN transmission is going to end (at time t3) before the scheduled start of the BT reception (at time t4), only then the WLAN packets may be transmitted from time t0. However, if, at or before time t0, if it is predicted that the WLAN transmission is going to end after the start of the next BT reception, then the WLAN transmission may not be started at all from time t0. This may avoid situations where BT packets are received simultaneously with transmitting WLAN packets.

In various embodiments, the end of the BT transmission and WLAN transmission may be marked with a transmission ending synchronization signal. Thus, the prediction and selective transmission of the WLAN packet from time t0 may ensure that the transmission ending synchronization occurs before a BT reception.

Figure 12B:
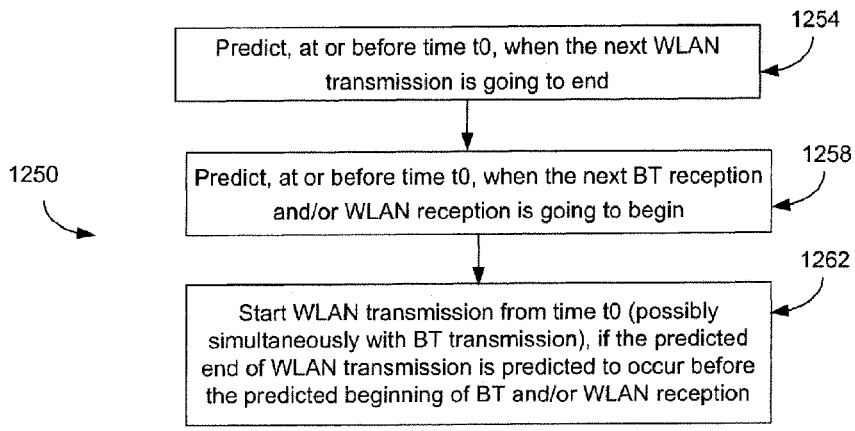
FIG. 12b illustrates an exemplary method for transmission ending synchronization.

FIG. 12b illustrates an exemplary method 1250 for transmission ending synchronization. Referring to FIGS. 12a and 12b, the method 1250 may include, at 1254, predicting, at or before time t0, when the next WLAN transmission is going to end. For example, referring to FIG. 12a, the device 14 may predict that the next WLAN transmission is going to end at or around time t3. At 1258, the device 14 may, at or before time t0, predict when the next BT and/or WLAN reception is going to begin. For example, referring to FIG. 12a, the device 14 may predict that the next BT and WLAN reception is going to begin at least after time t4. As BT packets are transmitted in slots, it may be possible to perform such prediction based on, for example, the assignment of the BT slots.

At 1262, the WLAN transmission may be started from time t0 (possibly simultaneously with BT transmission from time t1 to t2), if it is determined that the predicted end of WLAN transmission (i.e., time t3) is predicted to occur before the predicted beginning of BT and/or WLAN reception (i.e., at time t4). This may ensure that the transmission ending synchronization (later of time t2 and t3) occurs before reception of next BT and/or WLAN packets.

Although FIG. 12a illustrates both the BT reception and the WLAN reception and/or handshake starting at time t4, this may not necessarily the case, as will be readily understood by those skilled in the art. For example, in various embodiments, the BT reception and the WLAN reception and/or handshake may start at different time; however, method 1250 may ensure the transmission ending synchronization occurs before the earlier of the BT reception and WLAN reception.

Reception Ending Synchronization

Figure 13A:
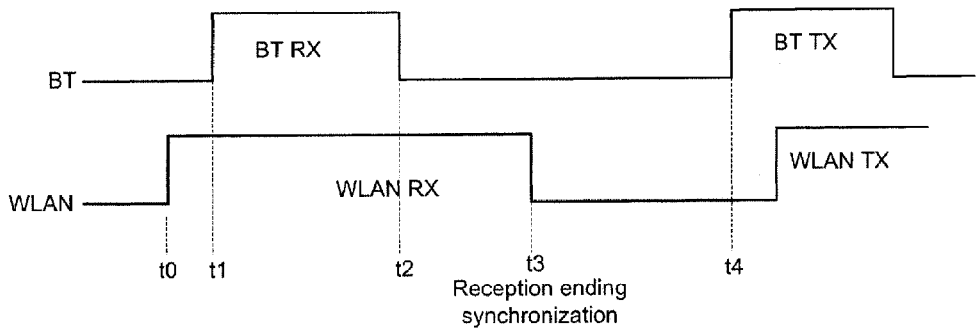
FIG. 13a illustrates an exemplary timing diagram for BT and WLAN packet transmission and/or reception by a device of FIG. 1.

FIG. 13a illustrates an exemplary timing diagram for BT and WLAN packet transmission and/or reception by the device 14 of FIG. 1. Referring to FIG. 13a, BT packets may be received between time t1 and t2, and BT packets may be scheduled for transmission from time t4 onwards. Also, reception of WLAN packets may start at time t0. In various embodiments, device 14 may predict (based in part, for example, on BT slot assignment), at or before time t0, that the BT transmission may start at or near time t4. Also, at or before time t0, the device may predict how long the next WLAN reception is going to last (i.e., may predict when the next WLAN reception would end). For example, the device 14 may transmit a power save (PS) poll to the WLAN AP 16, and the response received from the AP 16 may include indication of how long the next transmission from AP 16 (i.e., WLAN RX at device 14) may last. As will be readily understood by those skilled in the art based on the disclosure and teachings provided herein, the PS poll and the response may be transmitted and received, respectively, by the device 14 prior to time t0. The prediction of WLAN RX ending period may also be based, for example, in part of WLAN data rate, payload, etc.

As previously discussed, it may be desirable to avoid simultaneous BT transmission and WLAN reception. Thus, in various embodiments, at time t0, if it is predicted that the WLAN reception is going to end (at time t3) before the start of the next BT transmission (from time t4), then the WLAN packets may be received from time t0. However, if, at time t0, if it is predicted that the WLAN reception is going to end after the start of the next BT transmission, then the WLAN reception may not be started. For example, in that case, the device 14 may request the AP 16 to not transmit WLAN packets (e.g., by transmitting a busy or sleep signal to the AP 16).

Alternatively, if, at time t0, if it is predicted that the WLAN reception is going to end after the start of the next BT transmission, then the next BT transmission may be delayed or cancelled to avoid simultaneous WLAN reception and BT transmission.

Figure 13B:
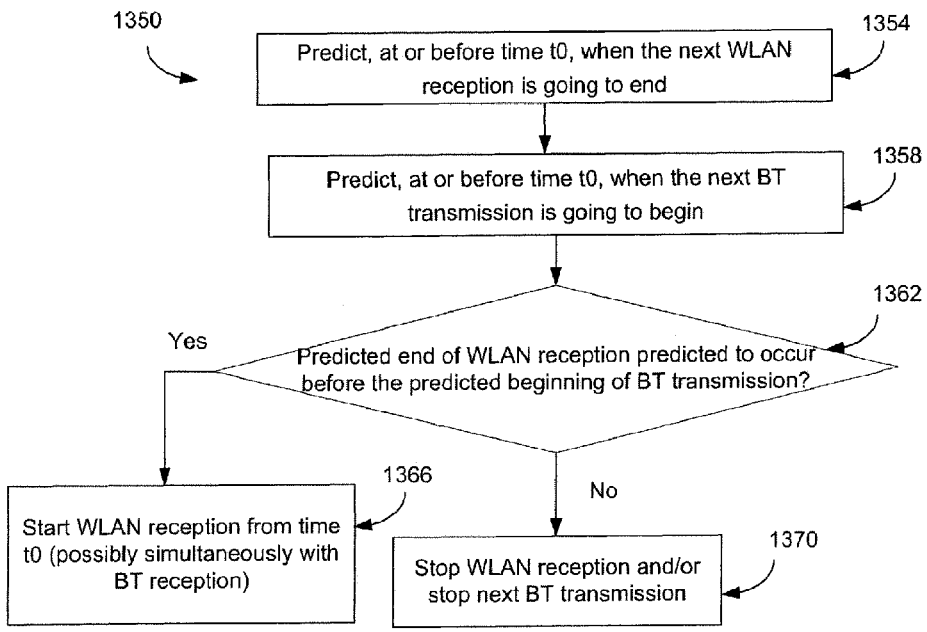
FIG. 13b illustrates an exemplary method for reception ending synchronization.

FIG. 13b illustrates an exemplary method 1350 for reception ending synchronization. Referring to FIGS. 13a and 13b, the method 1350 may include, at 1354, predicting, at or before time t0, when the next WLAN reception is going to end. For example, referring to FIG. 13a, the device 14 may predict that the next WLAN reception is going to end at or around time t3. At 1358, the device 14 may, at or before time t0, predict when the next BT transmission is going to begin.

For example, referring to FIG. 13a, the device 14 may predict that the next BT reception is going to begin at least after time t4.

The method 1350 may include, at 1362, determining if the predicted end of WLAN reception will occur before the predicted beginning of BT transmission. If the determination is positive, at 1366, WLAN reception may be started from time t0, possibly simultaneously with BT reception. If the determination at 1362 is negative, at 1370, the device 14 may request the AP 16 to not transmit the WLAN packets (so that the device 14 does not receive any WLAN packets) and/or the device 14 may not transmit the BT packets from time t4.

Speculative Reception of WLAN Beacon

A WLAN access point (e.g., AP 16 of FIG. 1) may periodically transmit beacons that may include management frames, as is well known to those skilled in the art. The beacons and the included management frames may be used for managing various WLAN activities, and for successful operation of the WLAN, it may be desirable that the device 14 receive the beacon frames.

Because of the coexistence of BT and WLAN, there may be interference between the two network and collision of BT and WLAN packets, due to which one or more beacons may be lost (i.e., not received by the device 14). In such circumstances, in various embodiments, the device 14 may transmit a probe request to the AP 16 and receive a probe response from the AP 16, from which the device 14 may retrieve required beacon information. It may be advantageous to transmit and receive probe request and probe response, respectively, at a higher data rate, as communication (i.e., transmission and/or reception) of WLAN packets at a higher rate may reduce chances of collision of one or more WLAN packets with the BT packets, as will be discussed in more detail herein later.

Figure 14A:
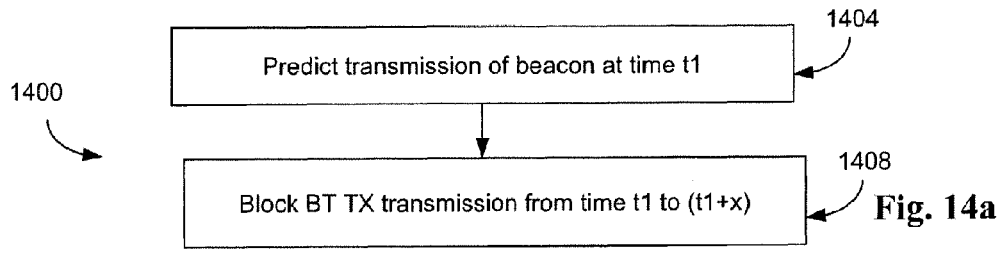
FIGS. 14a-14d illustrate exemplary methods for WLAN beacon reception.

FIG. 14a illustrates an exemplary method 1400 for WLAN beacon reception. In various embodiments, the AP 16 may transmit beacons at regular interval, and the device 14 may be aware of when the device 14 may expect to receive a beacon from the AP 16. For example, at 1404, device 14 may predict that the AP 16 may transmit beacons at time t1 (and also at time t1+T, t1+2 T, . . . , t1+nT, i.e., receive beacon periodically after every T ms). Based on this prediction, the device 14 may block BT transmission from time t1 to time (t1+x) (where x (2-10 micro second, for example) may be the maximum delay the beacon may experience to reach the device 14) so that no BT packets are transmitted by the device 14 while a WLAN beacon is expected by the device 14. As will be readily understood by those skilled in the art based on the disclosure and teachings provided herein, if the beacon is received by device 14 before the end of the time (t1+x), the device 14 may start transmitting BT packets instead of waiting until time (t1+x), if necessary.

Figure 14B:
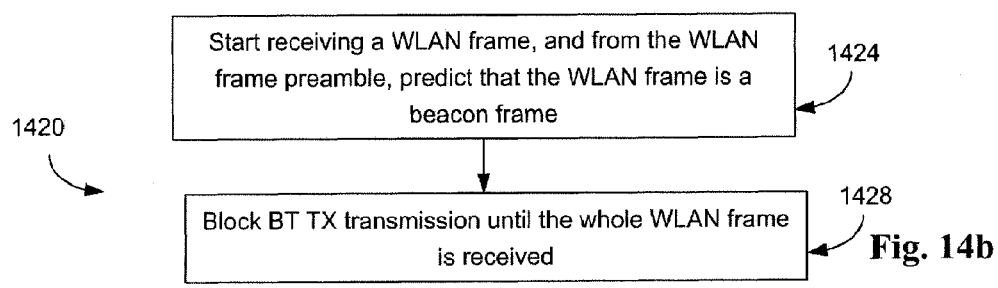

A WLAN frame received by the device 14 from the AP 16 may include various fields, including a WLAN frame preamble field that may be included at the beginning portion of the frame, followed by a machine address code (MAC) header, and one or more other fields, as is well known to those skilled in the art. In various embodiments, the device 14 may detect a WLAN frame preamble of a WLAN frame which is being received by the device 14. Based on the detection of the WLAN frame preamble, the device 14 may infer that the WLAN frame is a beacon frame, and accordingly, block all BT transmissions until the full WLAN frame is received. This may avoid any possible interference between the reception of the remaining portion of the WLAN frame and any potential BT transmission. FIG. 14b illustrates another exemplary method 1420 for WLAN beacon reception. At 1424, the device 14 starts receiving a WLAN frame, and from the WLAN frame preamble, predict that the WLAN frame is a beacon frame. At 1428, the device 14 may block BT TX transmission until the whole WLAN frame has been received.

In various embodiments, the prediction at 1424, based only on the WLAN frame preamble, may sometimes be erroneous as, for example, the WLAN frame may be transmitted by an access point of another network (i.e., not the WLAN network to which the device 14 belongs to) and/or may be for any other purpose, resulting in false detection.

Figure 14C:
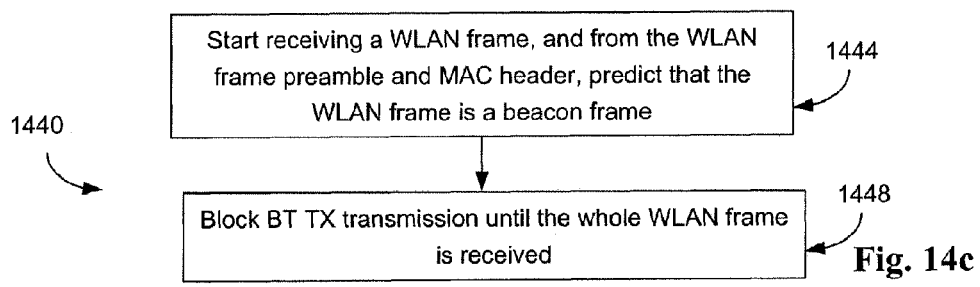

FIG. 14c illustrates another exemplary method 1440 for WLAN beacon reception. The method 1440 includes, at 1444, starting to receive a WLAN frame, and from the WLAN frame preamble and MAC header, predict that the WLAN frame is a beacon frame. Thus, unlike the method 1420 of FIG. 14b, the method 1440 may wait until it receives and detects the MAC header (which includes the transmitting AP and destination address) of the WLAN frame to predict that the WLAN frame may be a beacon frame. At 1448, the device 14 may block BT TX transmission until the whole WLAN frame has been received. In various embodiments, using the MAC header for the prediction may result is less error and false detection. But the MAC header may be transmitted after the WLAN frame preamble, and waiting for the MAC header may delay the prediction, thereby increasing chances of already starting the BT transmission before the prediction at 1444.

In various embodiments, a preamble signature may be included in preambles of WLAN frames transmitted by the AP 16. The preamble signature may include, among other information, the transmitting AP's address and/or the destination address of the WLAN frame, and/or other identification information. In various embodiments, the device 14 may be sure, after detecting the preamble signature, that the WLAN frame is a beacon frame, is transmitted by the AP 16, and is intended for the device 14.

Figure 14D:
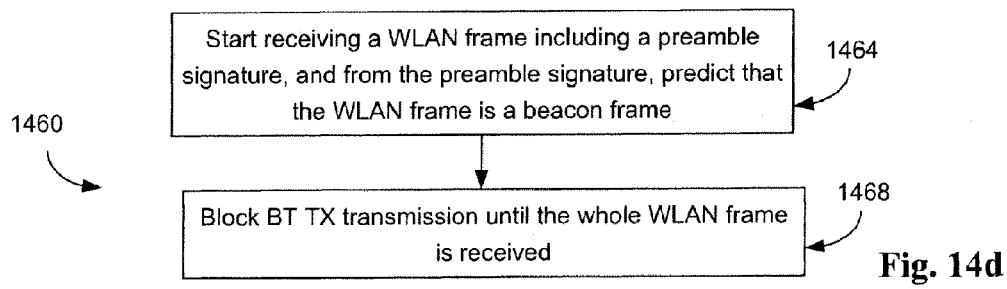

FIG. 14d illustrates another exemplary method 1460 for WLAN beacon reception. The method 1460 may include, at 1464, starting to receive a WLAN frame including a preamble signature in the frame preamble, and from the WLAN preamble signature, predict that the WLAN frame is a beacon frame. At 1468, the device 14 may block BT TX transmission until the whole WLAN frame has been received.

WLAN Rate Adaptation

In a conventional WLAN system (that is, when WLAN does not coexists with BT), a high frame error rate may imply, among other things, that the data transmission rate may be too high, and it sometimes may be advantageous to reduce the data rate. However, in various embodiments, in a BT/WLAN coexistence scenario, high frame error rate may be not because of high rate of transmission, but may be because of interference corruption due to BT-WLAN coexistence issues. In these scenarios, reducing the WLAN transmission rate may, instead of solving the problem, end in collision between the WLAN packets and BT packets because of a relatively low WLAN data transmission rate (as low WLAN data rate may result in the WLAN using the medium for a longer period, thereby increasing chances of collision with BT packets).

In various embodiments, it may be desirable to transmit WLAN packets at a rate at least higher than a threshold rate (henceforth referred herein as bottom rate). Ensuring the WLAN data rate is at least higher than the bottom rate may result in less collision between BT and WLAN packets (as WLAN may use the medium for relatively lesser time, thereby providing relatively more time to BT to use the medium).

In various embodiments, the bottom rate may be determined adaptively, and may depend on a number of factors, including signal to noise ratio (SNR) of WLAN signals, transmission power, path loss, etc. In various embodiments, a pilot frame (with minimal or no payload, i.e., minimal or no data) may be transmitted by the AP 16 and/or the device 14, and the bottom rate may be based, at least in part, on the signal quality of the received pilot frame. Bottom rate adaptation may also be performed by transmitting for a short duration using various data rates, and the minimum transmission rate that produces satisfactory result may be used as the bottom rate. Other ways of determining the bottom rate may be also envisioned by those skilled in the art based on the disclosure and teachings provided herein.

Figure 15:
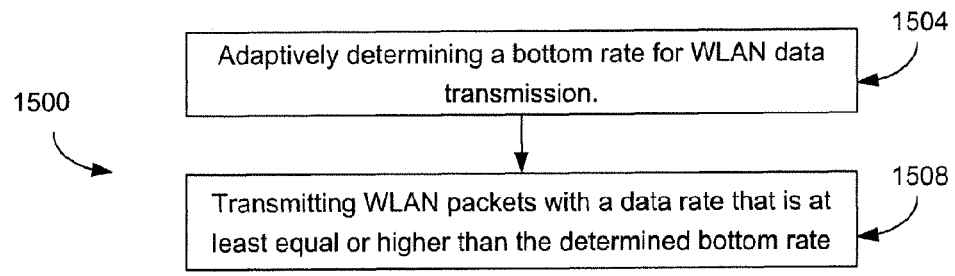
FIG. 15 illustrates an exemplary method for WLAN data rate control.

FIG. 15 illustrates an exemplary method 1500 for WLAN data rate control. In various embodiments, the method 1500 may include, at 1504, adaptively determining by the device 14 and/or access point 16 a bottom rate for WLAN data transmission. At 1508, the method may include transmitting WLAN packets with a data rate that is at least equal or higher than the determined bottom rate.

WLAN Preamble Control

A WLAN frame may have various types of preamble fields, e.g., a long preamble field, a short preamble field, and/or an orthogonal frequency-division multiplexing (OFDM) preamble field. One or more of these preamble fields may be utilized for WLAN communication based on several factors, including a type of the network, data transfer rate, etc. In various embodiments, a long preamble may be at least 192 micro second (μsec) long, and short and OFDM preambles may be 96 p sec and 20 μsec long, respectively. As previously discussed herein, in various embodiments, it may be desirable to increase the WLAN data rate, and accordingly, it may be desirable to use OFDM preamble instead of long preamble and short preamble (if link conditions is favorable to do so), as OFDM preamble may have significantly shorter duration as compared to a long or a short preamble.

Figure 16:
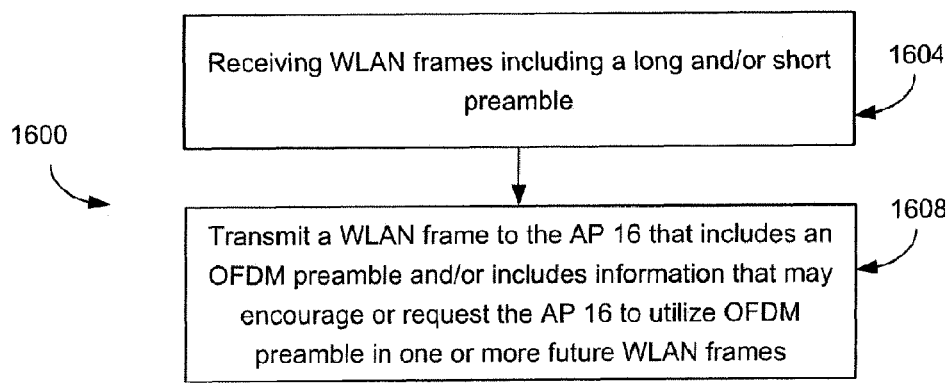
FIG. 16 illustrates an exemplary method for WLAN preamble control.

FIG. 16 illustrates an exemplary method 1600 for WLAN preamble control. Method 1600 may include, at 1604, receiving WLAN frames, by device 14, including a long and/or short preamble. At 1608, the device 14 may transmit a WLAN frame to the AP 16 that may include an OFDM preamble and/or may also include information that may encourage or request the AP 16 to utilize OFDM preamble in one or more future WLAN frames. Thus, the method 1600 may encourage the AP 16 to adapt the OFDM preamble, thereby decreasing the air time utilized by WLAN packets, and decreasing chances of collision of WLAN and BT packets.

WLAN Acknowledge Timing Control

In various embodiments, once the device 14 of FIG. 1 receives one or more WLAN frames from the AP 16, the device 14 may transmit an acknowledgement frame to the AP 16. There may be several ways of transmitting an acknowledgement frame based, for example, on the time gap between the end of receiving the one or more WLAN frames and start of the acknowledge frame. For example, a short interframe space (SIFS) acknowledgement frame may have relatively less gap between the end of receiving the one or more WLAN frames and start of the acknowledge frame; whereas an extended interfame space (EIFS) may have relatively more gap between the end of receiving the one or more WLAN frames and start of the acknowledge frame.

As previously discussed herein, under certain link conditions, it may be desirable to simultaneously receive BT and WLAN packets, but may not be desirable to simultaneously receive BT packet and transmit WLAN packet.

Accordingly, it may be possible to simultaneously receive BT and WLAN packets. However, once the WLAN packets are received, it may be desirable to transmit the WLAN acknowledgement frame only after the BT reception ends. However, if a SIFS acknowledgement is transmitted, the acknowledgement transmission may, in certain scenarios, start before the end of the BT reception. In these scenarios, it may be desirable to transmit a EIFS acknowledgement (instead of a SIFS acknowledgement) so that the acknowledgement transmission is delayed and starts after the end of the BT reception FIGS. 17*a* and 17*b* illustrate exemplary timing diagrams for WLAN acknowledgement timing control, and FIG. 17*c* illustrates an exemplary method 1750 for WLAN acknowledgement timing control.

Figure 17A:
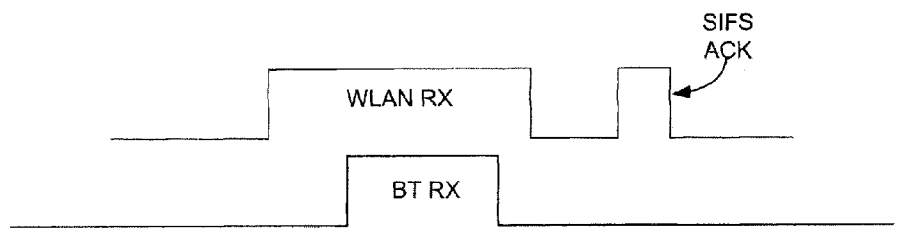
FIGS. 17a and 17b illustrate exemplary timing diagrams for WLAN acknowledgement timing control.
Figure 17B:
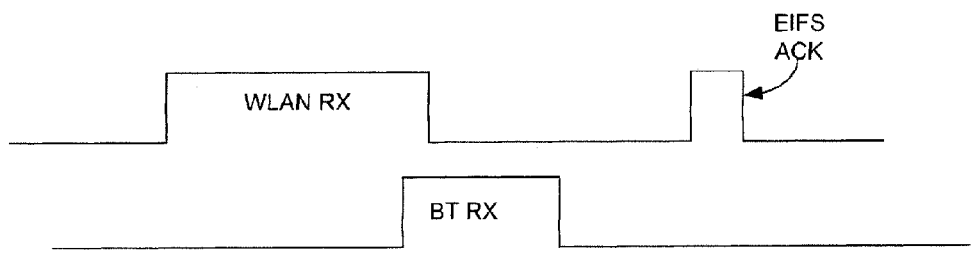
Figure 17C:
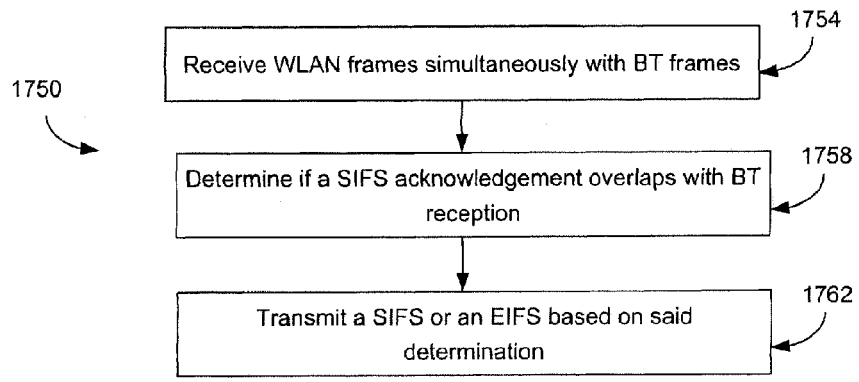
FIG. 17c illustrates an exemplary method for WLAN acknowledgement timing control.

Referring to FIGS. 17*a*-17*c*, the method 1750 may include, at 1754, receiving a WLAN frame simultaneously with a BT frame. At 1758, the method may include determining if a SIFS acknowledgement may overlap with BT reception. For example, for the scenario illustrated in FIG. 17*a*, the BT reception ends before the end of the WLAN reception, and in this case, it may be determined that a SIFS acknowledgement will not overlap with any BT reception. On the other hand, for the scenario illustrated in FIG. 17*b*, the BT reception may end after the end of the WLAN reception, and in this case, it may be determined that a SIFS acknowledgement may overlap with the BT reception.

Based at least in part on the determination made at 1758, the device 14 may transmit, at 1762, either a SIFS acknowledgement (as in FIG. 17*a*) or an EIFS acknowledgement (as in FIG. 17*b*).

In various embodiments, for some APs, a WLAN acknowledgement frame ACK may be transmitted at higher rate or at a different modulation mode to minimize an air time used for communicating the acknowledgement, thereby reducing chances of collision with BT communication.

BT Friendly WLAN AP Association

In various embodiments, the device 14 of FIG. 1 may have access to more than one WLANs, each having an associated AP (including, for example, access point 16). For example, a Wi-Fi hotspot may offer connectively to more than one WLANs, each from a different broadband service provider. In various embodiments, the device 14 may select a WLAN and an associated AP that is more BT friendly (i.e., a WLAN and an AP that provides relatively better support for WLAN-BT coexistence). For example, the device 14 may select a WLAN that offers better link quality, higher data rate (that may reduce probability of collision between WLAN packets and BT packets), etc. In various embodiments, the device 14 may select a WLAN such that an AP may not be too close to the BT enabled device 18 and/or device 14 to interfere with BT communications, etc. In other examples, in various embodiments, the device 14 may be aware of the BT hopping pattern, and may select a WLAN that offers WLAN channels that minimally use the BT hopping channels. In various embodiments, the device 14 may also periodically scan the medium to identify if any new WLAN network is available that is also BT friendly.

Exemplary Computing System

Figure 18:
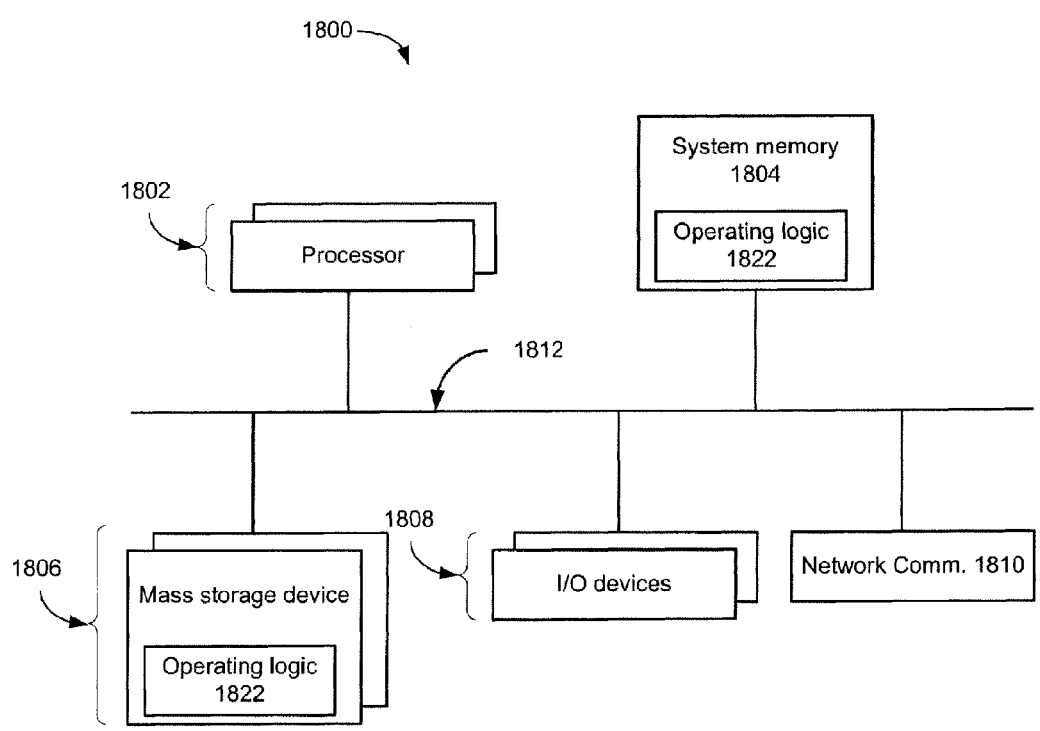
FIG. 18 is a block diagram of an exemplary system 1800 suitable for use to practice the present invention.

FIG. 18 is a block diagram of an exemplary system 1800 suitable for use to practice the present invention. As illustrated, system 1800 includes one or more processors or processor cores 1802, and system memory 1804. For the purpose of this application, including the claims, the terms "processor" and "processor cores" may be considered synonymous, unless the context clearly requires otherwise. Additionally, system 1800 may include one or more mass storage devices 1806 (such as diskette, hard drive, compact disc read only memory (CDROM) and so forth), input/output devices 1808 and communication interfaces 1810 (such as network interface cards, modems and so forth). The elements of FIG. 18 may be coupled to each other via system bus 1812, which may represent one or more buses. In the case of multiple buses, they may be bridged by one or more bus bridges (not illustrated).

Each of these elements performs its conventional functions known in the art. In particular, system memory 1804 and mass storage 1806 may be employed to store a working copy and a permanent copy of the programming instructions implementing all or a portion of earlier described functions, herein collectively denoted as 1822. The instructions 1822 may be assembler instructions supported by processor(s) 1802 or instructions that can be compiled from high level languages, such as C.

The permanent copy of the programming instructions may be placed into permanent storage 1806 in the factory, or in the field, through, for example, a distribution medium (not shown), such as a compact disc (CD), or through communication interface 1810 (from a distribution server (not shown)). That is, one or more distribution media having instructions 1822 may be employed to distribute the instructions 1822 and program various client devices. The constitution of these elements 1802-1812 are generally well known, and accordingly will not be further described.

In various embodiments, the system 1800 may be configured to operate as device 14 of FIG. 1 and may communicate with a WLAN AP (e.g., AP 16) and a BT enabled device (e.g., device 18), using an appropriate WLAN protocol and BT specification, respectively. The system 1800 may also include an appropriate front end processing system (including an antenna), as illustrated in any one of FIGS. 3-7. In various embodiments, the system 1800 may be configured to operate in a WLAN-BT coexistence environment, and may be configured to practice one or more of the embodiments previously described herein.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A method for receiving one or more first wireless local area network packets and one or more first Bluetooth packets, the method comprising:
   prior to receiving the one or more first wireless local area network packets,
      predicting a first time at which the reception of the one or more first wireless local area network packet is going to end, wherein predicting the first time at which the reception of the one or more first wireless local area network packet is going to end comprises
         transmitting a power saving poll,
         in response to transmitting the power saving poll, receiving a response, wherein the response includes an indication of a duration of time of transmission of the one or more first wireless local area network packets, and
         based on the response, predicting the first time, and
      predicting a second time at which a transmission of one or more second Bluetooth packets is going to start, the one or more second Bluetooth packets being different from the one or more first Bluetooth packets; and
   simultaneously receiving the one or more first wireless local area network packets and the one or more first Bluetooth packets in response to the first time being predicted to occur prior to the second time.

2. The method of claim 1, further comprising transmitting the one or more second Bluetooth packets at the second time in response to the first time being predicted to occur prior to the second time.

3. The method of claim 2, further comprising avoiding transmission of the one or more second Bluetooth packets at the second time in response to the second time being predicted to occur prior to the first time.

4. The method of claim 1, further comprising, in response to the second time being predicted to occur prior to the first time, notifying a device to not transmit the one or more first wireless local area network packets prior to the transmission of the one or more second Bluetooth packets.

5. The method of claim 1, wherein predicting the second time further comprises:
   based on an assignment of slots for one or both of transmission and reception of Bluetooth packets, predicting the second time.

6. The method of claim 1, further comprising:
   in response to an end of the reception of both the one or more first wireless local area network packets and the one or more first Bluetooth packets, issuing a reception ending synchronization signal.

7. The method of claim 1, further comprising:
   subsequent to the issuance of the reception ending synchronization signal, starting to transmit the one or more second Bluetooth packets.

\* \* \* \* \*